United States Patent [19]

Minto

[11] Patent Number: 4,749,079

[45] Date of Patent: Jun. 7, 1988

[54] STEP-BY-STEP CONVEYOR OF TUBES FOR TEXTILE MACHINES

[75] Inventor: Luigi Minto, S. Lucia Di Piave, Italy

[73] Assignee: Officine Savio SpA, Pordenone, Italy

[21] Appl. No.: 851,889

[22] Filed: Apr. 14, 1986

Related U.S. Application Data

[63] Continuation of Ser. No. 566,340, Dec. 28, 1983, abandoned.

[30] Foreign Application Priority Data

Dec. 29, 1982 [IT] Italy ................ 83510A/82

[51] Int. Cl.⁴ .............................................. B65G 25/00
[52] U.S. Cl. .................... 198/742; 198/345; 198/718; 198/746; 414/750; 414/753
[58] Field of Search ............... 198/740, 741, 742, 744, 198/346.2, 468.1, 468.2, 468.3, 345, 346, 746, 718; 414/750, 753

[56] References Cited

U.S. PATENT DOCUMENTS

| | | | |
|---|---|---|---|
| 2,808,746 | 10/1957 | Blomquist | 198/345 X |
| 2,817,461 | 12/1957 | Gilberty | 198/742 X |
| 2,937,553 | 5/1960 | Sherman | 198/746 X |
| 3,010,371 | 11/1961 | Riedel et al. | 198/742 X |
| 3,062,353 | 11/1962 | Opperthauser | 198/742 X |
| 3,417,852 | 12/1968 | Kidd | 198/742 X |
| 3,439,821 | 4/1969 | Hand | 198/744 X |
| 3,747,741 | 7/1973 | Brems . | |
| 3,786,911 | 1/1974 | Milazzo | 198/744 X |
| 4,170,284 | 10/1979 | Lachaussee | 198/742 X |
| 4,314,630 | 2/1982 | Greenwood, Jr. . | |
| 4,411,355 | 10/1983 | Furlette et al. . | |
| 4,545,107 | 10/1985 | Bellmann et al. | 198/744 X |

FOREIGN PATENT DOCUMENTS

| | | |
|---|---|---|
| 2257509 | 8/1975 | France . |
| 222256 | 8/1968 | Sweden . |
| 349920 | 12/1960 | Switzerland . |
| 346197 | 8/1972 | U.S.S.R. . |
| 763216 | 9/1980 | U.S.S.R. . |
| 899411 | 1/1982 | U.S.S.R. . |
| 967906 | 10/1982 | U.S.S.R. . |

Primary Examiner—Joseph E. Valenza
Assistant Examiner—Jonathan D. Holmes
Attorney, Agent, or Firm—Fitzpatrick, Cella, Harper & Scinto

[57] ABSTRACT

A conveyor for textile machines such as open-end spinning frames, winding machines, two-for-one twisting machines, and the like, which comprises a static conveyor channel, supply levers that cooperate momentarily with the conveyor channel and are provided with a to-and-fro movement, actuators for causing the supply leaves to cooperate momentarily with the conveyor channel, and positioners for the tubes. The conveyor may be installed parallel to the working side of the machine, and apparatus to gear-up and increase the to-and-fro travel distance of some of the supply leavers may be advantageously included.

12 Claims, 4 Drawing Sheets

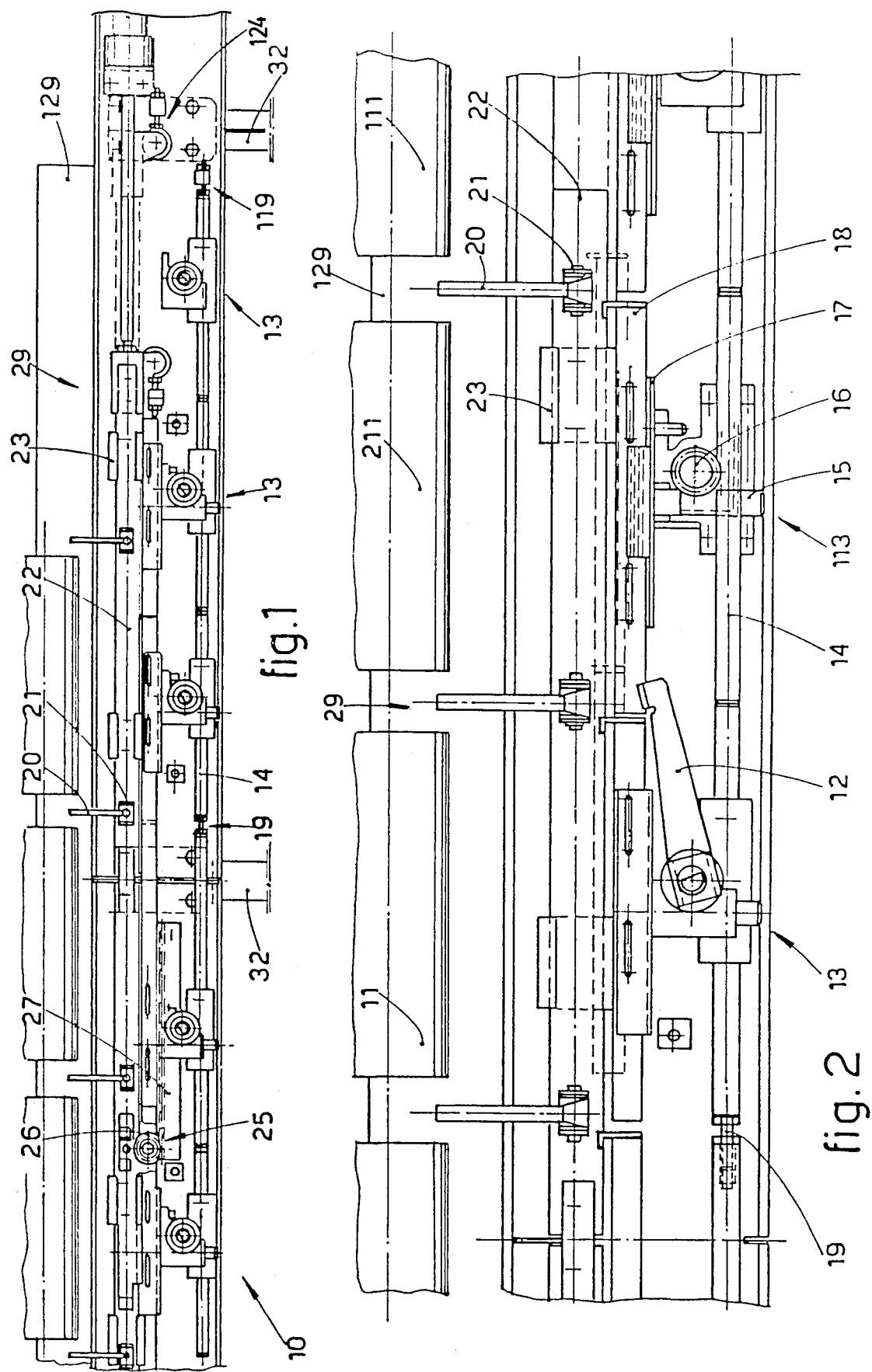

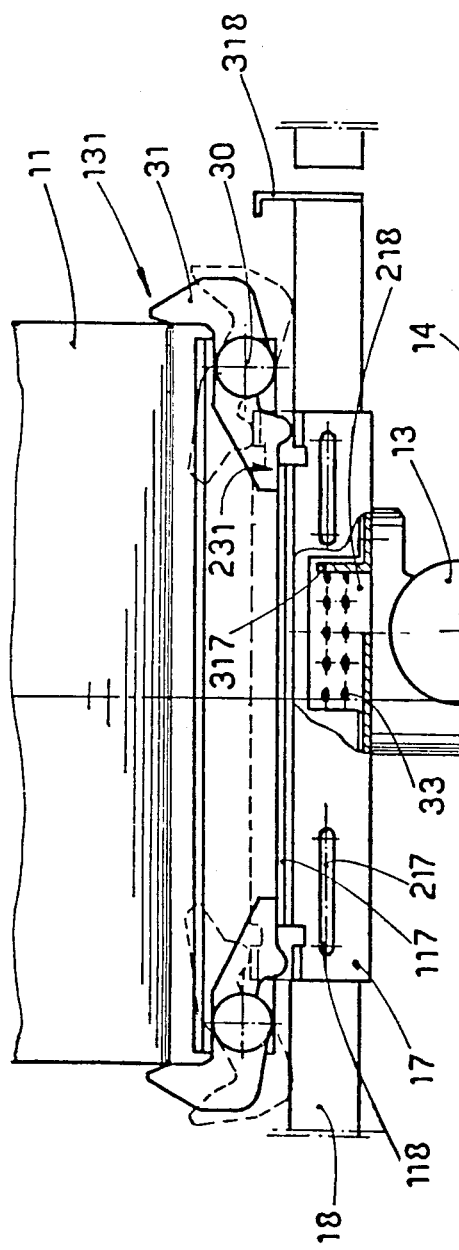
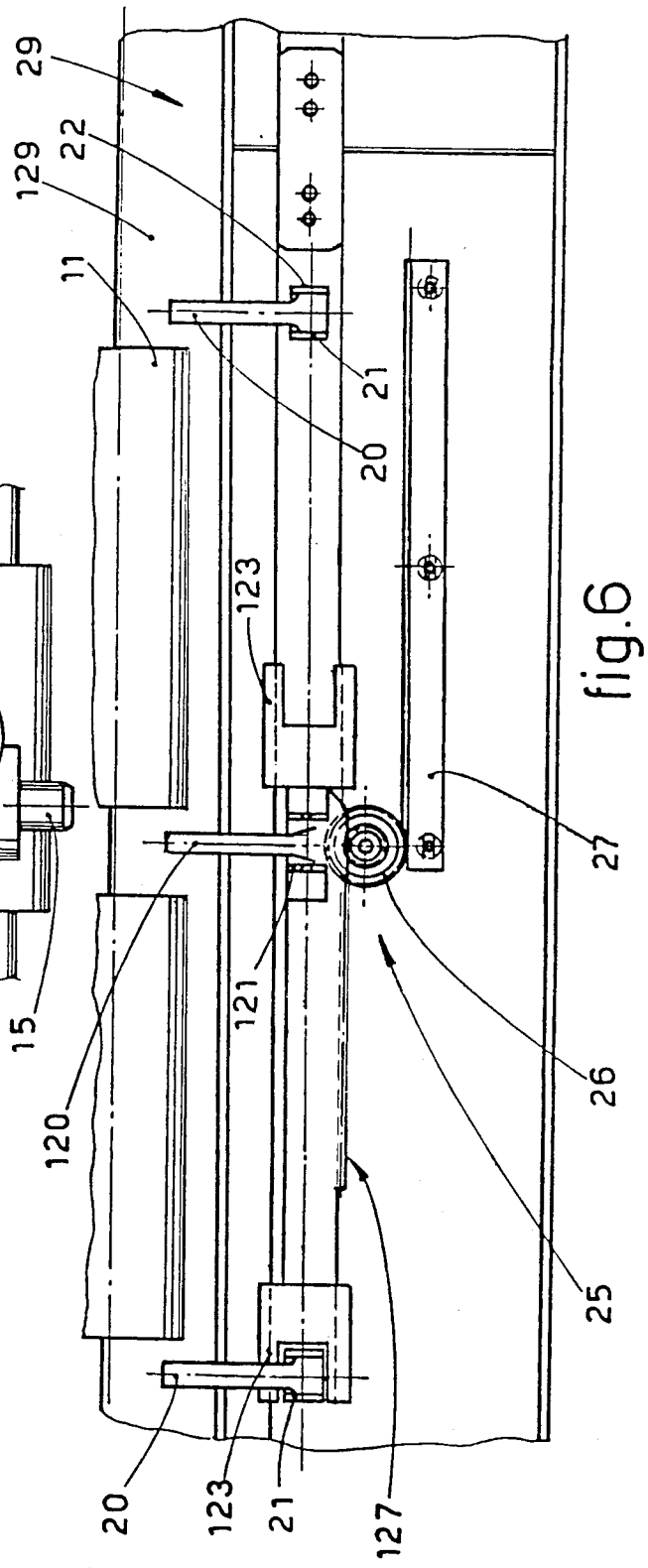

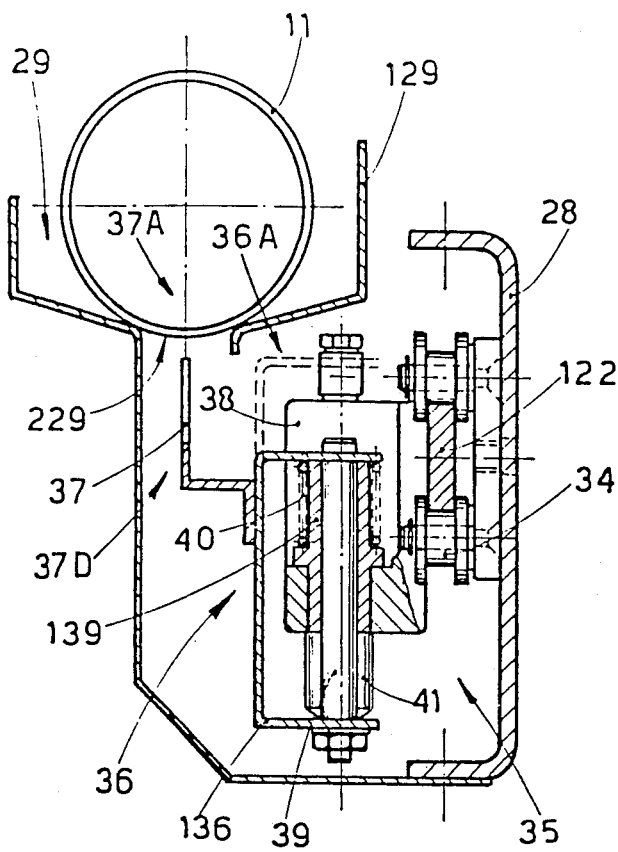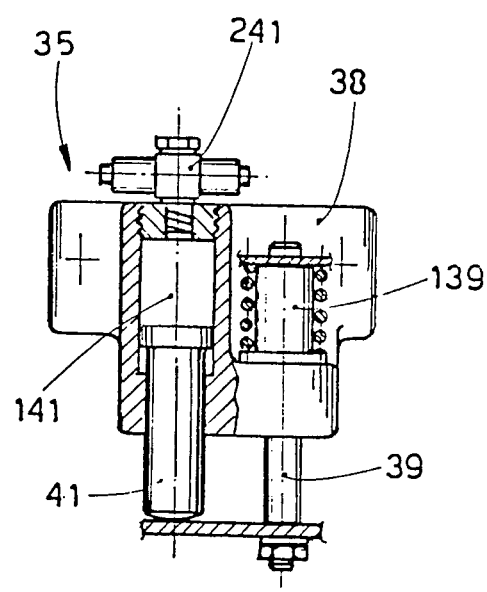
fig. 7 fig. 8
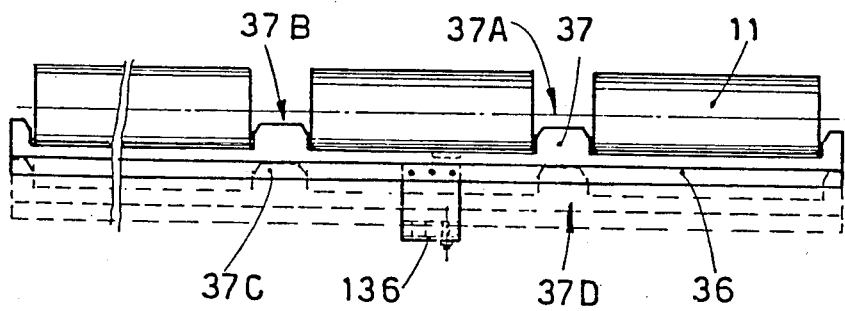
fig. 9
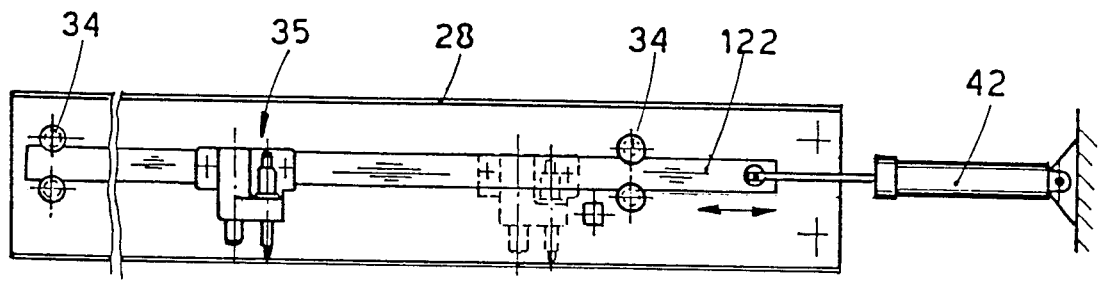
fig. 10

STEP-BY-STEP CONVEYOR OF TUBES FOR TEXTILE MACHINES

This application is a continuation of application Ser. No. 566,430 filed Dec. 28, 1983, now abandoned.

This invention concerns a step-by-step conveyor of tubes for textile machines. To be more exact, the invention concerns a device to convey tubes momentarily, progressively and step-by-step, the tubes being discharged at random from the device in coincidence with well defined individual positions in a direction at right angles to the direction of feed.

The tubes are of a type to be used for the winding of yarn packages on textile machines such as, for instance, open-end spinning machines, automatic winding machines and two-for-one twisting machines.

The device can therefore be fitted to all those textile machines on which the tubes, whether cylindrical, tapered or of another type, are employed in automatic or semi-automatic cycles.

According to the invention the textile machines to which the conveyor can be fitted correctly are machines that have at least one working side, which comprises a plurality of working units, the conveyor being positioned parallel to that side.

It is known that the automation of textile machines entails the doffing of full yarn packages (spools, flanged and tapered bobbins) and the automatic or semi-automatic feed of empty tubes to each processing position formed by the working units.

Many doffing and automatic loading devices are available on the market which consist of travelling carriages containing a small stock of tubes.

These carriage need to go back periodically to a pre-set loading point to replenish their stock.

Stationary storage points in correspondence with each working unit also exist and hold a determined maximum number of tubes but require a periodic check and the loading by hand of tubes which are lacking by the machine operator.

Turntable systems also exist which convey empty tubes continually and are replenished periodically at a loading station.

But all these systems involve many drawbacks such as the loss of output because of downtime while loading, the overall size of the systems themselves, the problems connected with maintenance of the systems and the handling and loading of the tubes needed by the individual units along the machine.

Moreover, in many cases the storage points of the working units are of necessity located in a high position hard to reach by the operator, this being due to technological and constructional problems.

Furthermore, most of the known systems are designed and constructed for a specific kind of tube and are hard to adapt, or need complex operations, if they have to be employed with tubes of other sizes.

The need of change tubes often in each individual textile machine is an ever greater requirement owing to the growing number of small and medium-sized batches of material to be processed with different and differentiated characteristics.

When tubes are conveyed with a closed-ring belt (as in Swiss Pat. No. CH 391.536), a series of tube containers located along the machine is envisaged.

The containers are moved so as to bring the tubes to coincide with the working unit requiring them and are then made to pass before a loading station so that the empty containers can be refilled.

Besides being complex and expensive and entailing many difficulties, this embodiment also involves the drawback that a space which has been emptied beforehand may pass by a unit needing a tube, with a resultant loss of time.

Among the various difficulties there is also the need to position the individual tube container exactly in coincidence with the individual working position and the loading group.

Next, there are the following: the need to halt the conveyor belt in an exact position whenever a working unit served by an automation carriage requires the latter: the high cost of embodiment owing to the need to connect the unit to a conveyor belt drive group: the necessity of reconciling the times, or halts, for central loading with the requirements of the usage units, a factor which entails unavoidable waiting leading to losses of output: the requirement that the belt should have a higher speed than that of the automation carriage (whenever an automation carriage is provided) so as to prevent a successive requirement of a tube by the carriage from coinciding with the space emptied beforehand, etc.

The likelihood that an empty space will coincide with a unit requiring a tube cannot be excluded if withdrawal of a tube is carried out by the individual unit or by a carriage working in temporary cooperation with an individual unit. For a space may be emptied upstream from a unit requiring a tube and then has to travel along the whole of its path to reach the loading station.

To solve this set of problems and drawbacks in a systematical manner, the present author has studied, experimented with and perfected the device of the invention, which offers many benefits and advantages.

The invention enables the individual working points to be supplied automatically and reduces to a minimum the losses of output. It also enables the withdrawal and delivery of tubes to be carried out mechanically by removal of the tube at right angles to the direction of feed of the tube on the conveyor. Moreover, it is simple, reliable and inexpensive and has very limited and simplified requirements for maintenance and maintenance actions.

Furthermore, as regards spare parts, the problems of their supply have been reduced substantially to a minimum by means of the invention.

The invention also enables various kinds of tubes to be fed without any need for special settings since it is self-adjusting.

Thus the invention makes it possible to deal with cylindrical or tapered tubes with diverse tapers, etc. by means of the same device and with minimal adjustments, or indeed without adjustments.

Step-by-step conveyors for generic products are known and are suitable for feeding individual stations from which such products have been discharged for any reason.

Such conveyors are disclosed in U.S. Pat. No. 3,747,741 (BREMS) and U.S. Pat. No. 4,314,630 (GREENWOOD). But these conveyors have not only been designed for generic products which have a specific flat side, but also disclose the transfer of the product in such a way that the product lies with its own lengthwise axis position at right angle to the lengthwise axis of the conveyor.

Moreover, it is not disclosed how such products are discharged nor why, and it is hard to understand their specific usage.

Furthermore, owing to the scanty requirement of accuracy needed by the operations linked to such conveyors no system for proper alignment and positioning is disclosed, nor is any system envisaged for momentary clamping of the products conveyed.

Other criticisms of such inventions are linked to the fact that the groups to control movement are movable and the embodiment is rather complex, with all the connected problems of maintenance, spares, technical service, adjustments and so forth.

The invention now proposed by the applicant envisages in substance a channel which is static in itself for the sliding and supporting of tubes, the channel being located along a working side of the machine.

According to a first embodiment this channel can comprise a slit which is positioned advantageously but not necessarily in a low position but which could also be positioned in a lateral position or almost in a lateral position or in a position at an angle to the channel.

According to a variant the channel comprises doors in correspondence with the specific working units, so that the tubes can be discharged through these doors.

A series of levers, which serve respectively for conveying and positioning the tubes, cooperate momentarily and when required with the channel, perhaps through the slit.

Self-alignment and positioning means, which do not take part during the movement of the tubes, are envisaged at each working position.

These self-alignment means can be of an adjustable type or can be replaced as a whole or else can be immovable and have means to position the end of a tube so as to adapt the device to the tubes.

According to one embodiment of the invention the levers themselves may constitute the self-alignment and positioning means and may themselves consist of projections or protrusions of one single movable element which positions and feeds the tubes.

An embodiment in which is envisaged a slit in the lower side of the conveyor channel is the embodiment which will be shown hereinafter as it is simple to explain, but this limitation of description does not exclude the other possibilities inherent and expressed in the invention since such possibilities are equivalents.

Likewise as regards the positioning means, we shall deal hereinafter with the embodiment having positioning teeth able to intervene momentarily and shall overlook the embodiment with immovable positioning means having an inverted or sloped surface and a ledge to position one end of a tube, the purpose of this being simplicity of description.

A plurality of supply levers is envisaged as cooperating momentarily and as required with the conveyor channel, the levers being connected to a lengthwise shaft able to move backwards and forwards along the side of the machine, the shaft having an advantageously continuous nature.

The supply levers have at least one position of rest and one position for contact with the conveyor channel. They are moved momentarily from the position of rest to the position of contact by a guide which can be lifted momentarily by a temporary actuation group.

When a tube located so as to coincide with a working unit requiring a tube is withdrawn, the corresponding temporary actuation group is actuated, for instance, by a temporary actuation lever, which in turn sets in motion all the temporary actuation groups located upstream.

All the temporary actuation groups located upstream and the aforesaid actuation group lift the respective raisable guides in coordination.

The raisable guides displace to the position of contact the corresponding supply levers moving backwards and forwards on the guides and bring them into cooperation with the conveyor channel and thus with the tube lying therein.

At the same time the raisable guides make use of an appropriate sideways extension to unclamp the positioning teeth, thus freeing all the tubes located upstream and allowing them to move forwards under the thrust of the supply levers, which make the tube advance until they have occupied the empty positions.

An appropriate means for advantageously continuous actuation imparts to the shaft able to move backwards and forwards a backwards and forwards movement such as to displace the tube by the desired amount and to move it from one to the other of two neighboring positions.

This movement causes displacement of all the tube located upstream from the one withdrawn and makes them occupy in coordination all the positions, including the position made empty just now by the withdrawal which has just taken place.

An appropriate loader, which is not shown as it is not a part of this invention, arranges for the continuous supply of tubes to the initial loading station.

Where there are different spacings along the same side of a machine, or else in the zones of separation between two spacings such as in the zone between shoulders of the machine for instance, the travel of the movement is suitably geared up by means of a system with a movable rack and an immovable rack, which is called a gearing-up system.

The device also enable the two sides of a machine to be left independent of each other, thereby providing the advantage of being able to use different tubes in the two sides.

This cannot be obtained or is hard to obtain with closed-cycle embodiments.

Moreover, according to the invention, while the replenishing of tubes or maintenance is being carried out on one side of the machine, the normal spinning operations can proceed on the other side.

In a variant of the invention a movable element is envisaged which bears protrusions serving not only for positioning purposes but also for the movement of the tubes. Several movable elements arranged in sequence can also be envisaged.

In this variant too means to gear up travel can be provided so as to provide for the shoulders of the machine or in correspondence with variations in the spacings.

This variant entails the movement of all the tubes both upstream and downstream from the station where a tube is required.

According to this embodiment the replenishing of tubes is performed by an automatic control every so many hours, or else by hand by the machine operator, with a number of steps the same as the number of stations served, until all the seatings for tubes on the conveyor have been filled.

Any tubes remaining on the conveyor and not used beforehand drop at the end of the conveyor into a collection bin.

The invention is therefore embodied with a step-by-step conveyor of tubes for textile machines such as open-end spinning frames, winding machines and two-for-one twisting machines having at least one working side, each working side comprising a plurality of working units defining the individual station for withdrawal of tubes from the conveyor, which provides the forward movement of all the tubes positioned upstream from a tube withdrawn in a direction at right angles to the lengthwise forward movement of such tube, which conveyor comprises in cooperation:

a static conveyor channel, supply levers cooperating momentarily with such conveyor channel and provided with a required to-and-fro movement, groups for temporary actuation of the supply levers, and means to position the tubes, the conveyor being installed parallel to the working side of the machine, and groups to gear up the travel of some of the supply levers being advantageously included.

Let us now see a preferred embodiment of the invention with the help of the attached figures, which have been given as a non-restrictive example. The figures show as follows:

FIG. 1 gives a front view of a part of an embodiment of the invention;

FIG. 2 gives an enlarged front view of part of the embodiment of FIG. 1;

FIG. 5 shows the group to position tubes in the withdrawal zone;

Figure 3:
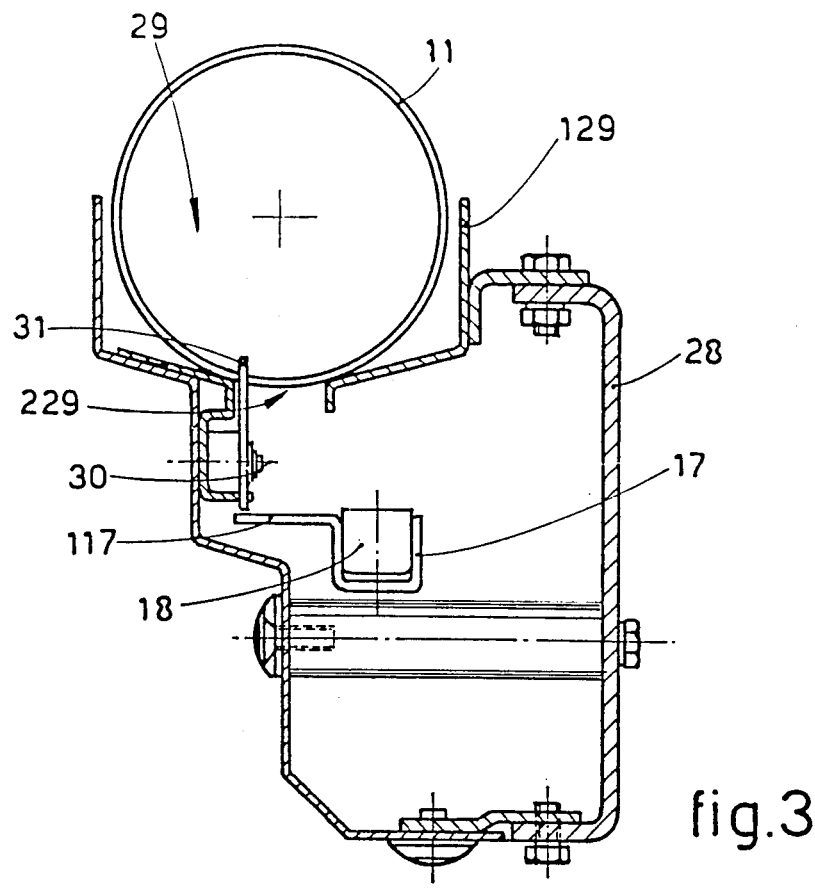
FIG. 3 shows a vertical, crosswise, desired section of the embodiment of FIG. 1.

FIG. 6 gives a diagrammatical view of the gearing-up group;

FIG. 7 shows a variant of the invention in cross section;

FIG. 8 shows the vertical displacement means of the movable element;

FIG. 9 shows the movable elements;

FIG. 10 shows the support-and-lengthwise-movements shaft of the movable element.

In the figures a conveyor 10 has a conveyor channel 29 with sidewalls 129 and a slit 229, which is positioned at the bottom of the channel in our example; in the channel 29 is a plurality of tubes 11, which are loaded as required by a loading group, which is not shown nor described here as it is not part of the invention.

For simplicity of description, let us envisage that a tube 111 lies momentarily in the usage position and is required by the unit cooperation with that position.

In our example the tube 111 is advantageously positioned by positioning teeth 31 pivotable at 30 and comprising positioning means 131 which cooperate with the ends of the tube itself 111.

The positioning teeth 31 are retracted by a sideways extension 117 of a lodgement cradle 17 when the latter rises, as we shall see hereafter.

When the sideways extension 117 is lifted, it cooperates with a retracting tail 231 and makes the positioning means 131 drop, thereby freeing the tube 111.

The positioning teeth 31 can be immovable, adjustable or be replaced with other pre-positioned teeth. As said earlier, according to a variant a positioning surface can be envisaged instead of the positioning teeth 31 and be sloped upwards to advantage in the direction of forward movement of the tubes and can have a positioning tooth to position the end of the tubes 11.

When the tube 11 is withdrawn, the withdrawal and control group, which in itself is of a known type and is not shown nor described here as it is not part of the invention (for instance, a loading carriage or other like unit), actuates, for example a temporary actuation lever 12 comprised in a temporary actuation group 113 located just upstream from the tube 111.

The actuation of the temporary actuation group 113 sets in rotation a toothed wheel 16, which raises a lifting pin 15 and displaced a thrust rod 14 upstream and sideways.

The words "upstream" and "downstream" here indicate figuratively the position of the various parts in relation to a hypothetical observer.

A means for recovery of positions 19 may be included between one thrust rod 14 and another.

The thrust rod 14 of the temporary actuation group 113 thrusts against all the thrust rods 13 upstream from the temporary actuation group 113 and thus sets in rotation all the toothed wheels 16 of all the temporary actuation groups 13 located upstream from the group 113. The toothed wheels 16 in turn displace the lifting pins 15 upwards.

Each lifting pin 15 is solidly fixed to the lodgement cradle 17, which comprises a raisable guide 18. The raisable guide 18 is positioned resiliently in the axial direction within the lodgement cradle 17.

Slots 217 are comprised in the lodgement cradle 17 and cooperate with pins 118 located in the raisable guides 18. Moreover, there is present in the raisable guide 18 a housing 218 in which an abutment ridge 317 in the cradle 17 runs.

A resilient means or return spring 33 is located between the abutment ridge 317 and one end of the housing 218 and serves to keep the raisable guide 18 positioned resiliently within the lodgement cradle 17.

An abutment shoulder 318, which may comprise a hook at its upper end, is comprised at the end of the raisable guide 18 in the direction of forward movement of the tubes 11.

This abutment shoulder 318 serves to engage the supply lever 20 when the latter 20 in its travel (see the dashed lines in FIG. 2) goes beyond the normal lengthwise position of the raisable guide 18.

As the supply lever 20 completes a run longer than the length of the raisable guide 18, in such circumstances the lever 20 itself would tend to drop and to be supported no longer by the raisable guide 18.

Instead, the presence of the abutment shoulder 318 ensures that the supply lever 20 displaces, according to requirements, the raisable guide 18 which keeps the lever 20 raised.

When the supply lever 20 no longer pulls forwards the raisable guide 18, the latter stays in contact with the abutment shoulder 318 even in the initial tract of its return travel owing to the action of the return spring 33, which has resisted resiliently the forward movement of the raisable guide 18.

When the supply lever 20 has reached its furthest forward point as defined by means 124 which regulate travel, an appropriate scanner, which may be located in the means 124 regulating travel or in the tube withdrawal unit or in another unit (the only relevant fact here is that his scanner exists, and it is not important whether it is electrical, optical, photo-optical or of another type), signals that the lever 20 has reached its furthest forward point.

If only one tube has been collected, this signal causes the temporary actuation group 13 to be disactivated stably and everything is ready for the next withdrawal of a tube 11.

When the tube 11 is removed, therefore, the control means acts, for instance, on the lever 12 of the temporary actuation group 13 and all the raisable guides 18 are lifted, including the one coinciding with the tube 111 and the one located upstream from the tube 111 withdrawn.

Figure 4:
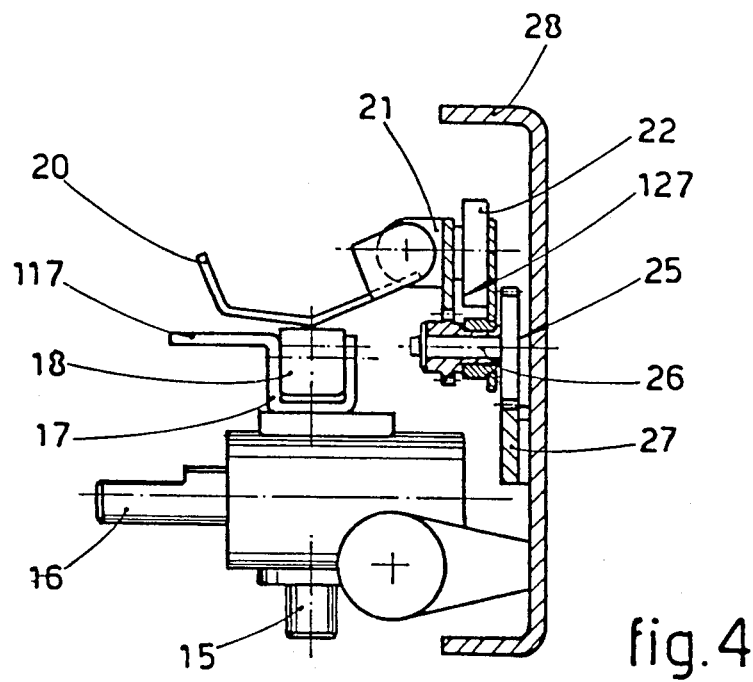
FIG. 4 shows another vertical, crosswise, desired section of the embodiment of FIG. 1.

When the raisable guides 18 are lifted (see FIG. 4), they act on the supply levers 20 cooperating with the position of the tube 111 and with the positions upstream therefrom and raise the levers 20 to such an extent as to penetrate into the slits 229 and, after a short travel, to contact the tubes 11 located upstream from the tube 111 withdrawn.

This supply lever 20 is connected to a continuous actuation means 24, which imparts to a shaft 22 able to go backwards and forwards a substantially continuous backward and forward movement; thus the supply levers 20 too have a continuous backward and forward movement.

The shaft 22 able to go backwards and forwards bears supports 21, on which in turn the supply levers 20 are borne and can pivot.

Thus the supply levers 20 displace forwards all the tubes 11 positioned upstream from the tube 111, so that the tube 211 which lies immediately upstream from the tube 111 moves into the position of the tube 111 and all the tubes following the tube 211 move forwards by one place.

As we said earlier, when this transfer has been completed, the temporary actuation lever 12 is no longer activated and all the raisable guides 18 are lowered.

When the raisable guides 18 are lowered, all the supply levers 20 too are lowered and no longer contact the tubes above them although they continue to move backwards and forwards.

When the raisable guides 18 are lowered, the sideways extensions 117 (see FIG. 3) no longer cooperate with the retraction tails 231, and the positioning teeth 31 therefore rise and the positioning means 131 return so as to position the tubes 11 and to ready them for the next withdrawal.

The shaft 22 able to move backwards and forwards is supported and can slide on guiding supports 23, which in turn are upheld by a carrying frame 28.

The shaft 22 is actuated by a continuous actuator means 24 and by means 124 regulating travel.

The position of rest of the thrust rods 14 is determined axially by means 119 regulating the end of run for rest.

The continuous actuator means 24 can consist of a jack or another means suitable for the purpose.

Gearing-up groups 25 can be envisaged in correspondence with the shoulders 32 of the machine or with areas where the travel of the tubes has to be differentiated either willingly or of necessity.

In our example these gearing-up groups 25 comprise two racks 27-127, which cooperate with gearing-up wheels 26 having a number of teeth differing according to a desired ratio. In this way the supply lever 20 working at the shoulders can perform a course differentiated from that of the other levers 20.

The rack 27 of our example is immovable, whereas the gearing-up wheels 26 are rotatably secured to the shaft 22 able to move backwards and forwards.

Guiding supports 123 which bear the rack 127 are able to run on the shaft 22 able to move backwards and forwards.

When the shaft 22 is moved, it moves in a coordinated manner the gearing-up wheels 26, which mesh with the rack 27 and make the rack 127 run on the shaft 22 more or less quickly (depending on the ratio envisaged.)

One or more supply levers 120 can be fitted to the rack 127 and will therefore undergo a relative displacement having a desired value different from that of the other supply levers 20.

According to a variant shown in FIG. 7 a movable element 36 is envisaged and bears supply levers 37 solidly fixed to it. These supply levers 37 in this case consist of shaped projections of the movable element 36.

More than one of such movable elements 36 can be envisaged and will be arranged in such a case in succession along the side of the spinning frame.

The element 36 can perform a lengthwise movement to thrust the tubes 11 forwards step-by-step and can also be displaced vertically for disengagement from the tubes 11 so as to be able to carry out a return movement below the tubes 11.

The horizontal movement of the element 36 is made possible by a shaft 122 able to move to-and-fro, which can slide backwards and forwards (see also FIG. 10) and is driven by an actuator 42 consisting of a jack located at one end of the shaft 122 in this case.

The shaft 122 can slide on support rollers 34, as shown in FIGS. 7 and 10. The shaft 122 itself supports vertical displacement means 35, which can be included in variable numbers.

The variable displacement means 35 in their turn support the movable element 36 and displace it upwards or downwards according to the requirements of the cycle.

As can be seen in FIG. 7, the element 36 is solidly fixed to a pin 39, or other equivalent means, which can slide within a sleeve 139.

A spring 40 or another equivalent resilient means normally keeps the pin 39 and therefore the element 36 in the raised position marked with 36A.

In this raised position 36A the levers 37 are located at position 37A, shown with lines of dashes in the figure, this position being the same as position 37A in FIG. 9. In this position the levers 37 position the tubes 11, which thus cannot be displaced.

The following cycle is performed to carry out forward movement by one step:

(a) At the beginning the lever 27 lies in position 37A, this being so for all the levers 37 solidly fixed to the movable element 36. The jack 42 is then actuated. The shaft 122 moved forwards by one step and therefore the levers 37 of the element 36, which is supported by the shaft 122 through the vertical displacement means 35, themselves move forwards by one step.

A lever 37 located initially at 37A, therefore, moves to 37B and thus causes the tube 11 engaged by its 37 to move forwards by one step.

(b) The piston 41 of the vertical displacement means 35 is actuated; in the example shown the piston 41 is driven by compressed air delivered to a distributor means 241.

The piston 41 can slide within an appropriate cylinder 141 in the body 38 and, when it is driven, thrusts against a bracket 136 of the element 36.

In this way the element 36 is thrust downwards and thus disengages the tubes 11 which are lying in the conveyor channel 39. The spring 40 is compressed by this action of the piston 41. The spring 40 is compressed by this action of the piston 41. The lever 37 positioned at 37B moves to 37C.

(c) The jack 42 is actuated again but in the opposite direction, and the lever 37 moves from 37C to 37D.

(d) The feed of compressed air to the piston 41 is cut off, for instance by the distributor 241 discharging into the atmosphere, and in this way the spring 40 can bring the movable element 36 back to its raised position, the tubes 11 being positioned anew, and the lever 37 solidly fixed to the movable element 36 being displaced once more to position 37A. In this way the element 36 is repositioned in the same position as its starting position.

According to this variant, at the time of replenishment of tubes either an automatic control or a manual control worked by the machine operator sets in motion a number of cycles such as that detailed above and equal to the overall number of tubes which can be lodged on the conveyor.

This number can be pre-set, for instance, by counter means or impulse means or equivalent means.

When the replenishment of the device has been completed, the device halts, and forward movement by one step is actuated only when a tube is withdrawn by a unit which requires a tube.

As mentioned earlier, any tubes which may be left on the conveyor after the majority of the tubes have been withdrawn by units requiring tubes, reach the end of the conveyor and drop into an appropriate collection bin, from which they can be taken out at random by the machine operators.

According to a variant which is not shown, it is possible to arrange the piston 41 so that it acts in the direction of ascent of the element 36, and to arrange the spring 40 so that it acts in the direction of descent of the element 36. It is also possible to arrange for a piston 41 to act in two directions.

The embodiment in which the piston 41 is arranged to act in the direction of ascent of the element 36 and the spring 40 acts in the direction of descent of the element 36, however, entails the feed of compressed air even when the element 36 lies in its raised position to position tubes, and therefore entails the presence of pressure in this condition too, which is the normal working condition of the whole device.

In the long term, problems of pressure seals may occur with leakages and other drawbacks.

That embodiment shown in which resilient means such as springs 40 or the like (see FIG. 7) are employed for the normal positioning of the element 36 is therefore preferable, the pistons 41 being used only to perform the descent travel from 37B to 37C; thus there is normally no feed of fluid under pressure to the jacks 42.

In this variant the element 36, as said earlier, carries out at one and the same time the functions of foward movement of the tubes 11 and the positioning of the tubes 11 on the conveyor 29, these being functions which in the variant examined previously were performed separately by the supply levers 20 and by the positioning teeth 31 respectively.

In this case too, as said earlier, it is possible to envisage means to gear up travel at the positions where there are differing spacings or at the shoulders of the spinning frame.

For instance, there can be means to gear up travel which act on a movable element having only two levers 37, this element being located between two movable elements 36 of the type shown in FIG. 9.

Such movable element can have a travel differentiated in relation to the two elements 36 upstream or downstream respectively.

Thus, the passage between the two movable elements 36 is embodied with a step different from that comprised in the elements 36.

INDEX

10—conveyor
11—tube
111—tube
211—tube
12—temporary actuation lever
13—temporary actuation group
113—temporary actuation group
14—thrust rod
15—lifting pin
16—toothed wheel
17—lodgement cradle
117—sideways extension
217—slots
317—abutment ridge
18—raisable guide
118—pins
218—housing
318—abutment shoulder
19—means to recover positions
119—means to adjust end of run for rest
20—supply lever
120—supply lever on rack 127
21—support
121—support on rack 127
22—shaft able to move backwards and forwards
122—shaft able to move backwards and forwards
23—guiding supports
123—guiding supports
24—continuous actuator means
124—means to regulate travel
25—gearing-up group
26—gearing-up wheels
27—rack
127—rack
28—supporting frame
29—conveyor channel
129—sidewalls
229—slit
30—pivot
31—positioning means
213—retracting tail
32—shoulders
33—return spring
34—support rollers
35—vertical displacement means
36—movable element
36A—raised position
136—bracket
37—solidly fixed supply levers
37A—position of supply lever
37B—position of supply lever
37C—position of supply lever
37D—position of supply lever
38—body 39—pin
139—sleeve
40—spring
41—piston
141—cylinder
241—distributor
42—actuator or jack.

I claim:

1. A step-by-step conveyor of tubes for textile machines such as open-end spinning frames, winding machines and two-for-one twisting machines having at least one working side, each working side comprising a plurality of working units defining a plurality of individual stations for withdrawal of tubes from the conveyor, which conveyor comprises:

supply means for providing forward movement of at least all tubes positioned upstream from a tube withdrawn in a direction at right angles to the lengthwise forward movement of such tube, a static conveyor channel for supporting tubes as they are conveyed and from which said tubes are withdrawals randomly at said individual stations, said supply means cooperating momentarily with such conveyor channel, means for providing to said supply means a required longitudinal to-and-fro movement, momentary actuation means for causing the supply means to cooperate with the conveyor channel momentarily, and means for withdrawably positioning the tubes at the individual stations, said means for positioning being fixed relative to the longitudinal movement of the supply means, so as to precisely position the tubes at the individual stations, the conveyor being installable parallel to the working side of the machine, in which conveyor a single means (a) causes the supply means to cooperate with the conveyor channel and (b) causes the positioning means to be withdrawn from within the path defined by the lengthwise forwad movement of the tubes.

2. A step-by-step conveyor of tubes as claimed in claim 1, in which the conveyor channel comprises sidewalls for holding and guiding the tubes and a slit included therein for momentary cooperation of the conveyor channel with the supply means.

3. A step-by-step conveyor of tubes as claimed in claim 1 in which the supply means cooperates with a shaft for backwards and forwards movement in response to continuous actuator means and has at least one position in temporary interposition within the path of the tubes in the conveyor channel.

4. A step-by-step conveyor of tubes as claimed in claim 1 in which the means for withdrawably positioning the tubes comprises means within the conveyor channel.

5. A step-by-step conveyor of tubes as claimed in claim 1 in which the means for withdrawably positioning said tubes comrises teeth which can be momentarily retracted.

6. A step-by-step conveyor of tubes as claimed in claim 1 in which the individual stations for withdrawal of tubes are located at differentiated travel distances and the conveyor comprises means for altering the travel distance of a supply means in its to-and-fro movement, said means for altering the travel distance comprising the means for providing the to-and-fro movement and gear means interposed between said means for providing the to-and-fro movement and said supply means.

7. A step-by-step conveyor of tubes as claimed in claim 6 in which the means for altering the travel distance comprises:

an immovable rack means, gear wheels which are rotatably fixed to the means for providing to-and-fro movement and which mesh with said immovable rack means, and with a movable rack means which is slidable on the means for providing to-and-fro movement and which bears at least one supply means.

8. A step-by-step conveyor of tubes for textile machines such as open-end spinning frames, winding machines and two-for-one twisting machines having at least one working side, each working side comprising a plurality of working units defining a plurality of individual stations for withdrawal of tubes from the conveyor, which conveyor comprises:

supply means for providing forward movement of at least all tubes positioned upstream from a tube withdrawn in a direction at right angles to the lengthwise forward movement of such tube, a static conveyor channel for supporting tubes as they are conveyed and from which said tubes are withdrawable randomly at said individual stations, said supply means cooperating momentarily with such conveyor channel, means for providing to said supply means a required longitudinal to-and-fro movement, momentary actuation means to cooperate with the conveyor channel momentarily, and means for withdrawably positioning the tubes at the individual stations, said means for positioning being fixed relative to the longitudinal movement of the supply means, so as to precisely position the tubes at the individual stations, theconveyor being installable parallel to the working side of the machine, in which conveyor said momentary actuation means comprises means for individually actuating only supply means upstream from a tube randomly withdrawn in a direction at right angles to the lengthwise forward movement of such tube so as to cause only those upstream supply means to cooperate with the conveyor channel momentarily, and in which conveyor a single means (a) causes the supply means to cooperate with the conveyor channel and (b) causes the positioning means to be withdrawn from within the path defined by the lengthwise forward movement of the tubes.

9. A step-by-step conveyor of tubes as claimed in claim 8 in which said momentary actuation means comprises lifting pins which support lodgement means, said lodgement means bearing displaceable guides for the momentary cooperation of the supply means with the inside of the conveyor channel.

10. A step-by-step conveyor of tubes as claimed in claim 9 in which the lodgement means comprises extensions for retracting momentarily means, which comprise teeth, for withdrawably positioning said tubes.

11. A step-by-step conveyor of tubes as claimed in claim 9 in which the lodgement means comprises lengthwise slots for guiding the displaceable guides and a resiliently resistant return spring means.

12. A step-by-step conveyor of tubes as claimed in claim 9 in which the displaceable guides comprise means at their ends for cooperating momentarily with the supply means and actuating lengthwise an end-of-run stop.

* * * * *

UNITED STATES PATENT AND TRADEMARK OFFICE
CERTIFICATE OF CORRECTION

PATENT NO. : 4,749,079  
DATED : June 7, 1988  
INVENTOR(S) : LUIGI MINTO

Page 1 of 3

It is certified that error appears in the above-identified patent and that said Letters Patent is hereby corrected as shown below:

AT [57] IN THE ABSTRACT

Line 7, "leaves" should read --levers--.  
Line 11, "leavers" should read --levers--.

COLUMN 1

Line 35, "carriage" should read --carriages--.  
Line 46, "downtime" should read --downtimes--.

COLUMN 2

Line 67, "position" should read --positioned--.  
Line 67, "angle" should read --angles--.

COLUMN 4

Line 10, "tube" should read --tubes--.  
Line 16, "tube" should read --tubes--.  
Line 24, "tube" should read --tubes--.  
Line 36, "machine" should read --machine,--.  
Line 40, "enable" should read --enables--.

COLUMN 6

Line 15, "displaced" should read --displaces--.

COLUMN 7

Line 1, "his" should read --this--.

UNITED STATES PATENT AND TRADEMARK OFFICE
CERTIFICATE OF CORRECTION

PATENT NO. : 4,749,079            Page 2 of 3
DATED : June 7, 1988
INVENTOR(S) : LUIGI MINTO It is certified that error appears in the above-identified patent and that said Letters Patent is hereby corrected as shown below:

COLUMN 8

Line 38, "variable" should read --vertical--.
    Line 55, "lever 27" should read --lever 37--.
    Line 63, "its 37" should read --it 37--.

COLUMN 9

Line 7, "The spring 40 is compressed" should be deleted.
    Line 8, "by this action of the piston 41." should be deleted.
    Line 61, "andthe" should read --and the--.

COLUMN 10

Lin 54, --131 positioning means-- should be inserted.

COLUMN 11

Line 21, "drawals" should read --drawable--.
    Line 40, "forwad" should read --forward--.
    Line 58, "comrises" should read --comprises--.

UNITED STATES PATENT AND TRADEMARK OFFICE
CERTIFICATE OF CORRECTION

| | | |
|---|---|---|
| PATENT NO. : | 4,749,079 | Page 3 of 3 |
| DATED : | June 7, 1988 | |
| INVENTOR(S) : | LUIGI MINTO | |

It is certified that error appears in the above-identified patent and that said Letters Patent is hereby corrected as shown below:

COLUMN 12

Line 28, "means to" should read --means for causing the supply means to--.

Line 34, "theconveyor" should read --the conveyor--.

Signed and Sealed this

Third Day of January, 1989

*Attest:*

DONALD J. QUIGG

*Attesting Officer*     *Commissioner of Patents and Trademarks*